United States Patent
Martin et al.

(10) Patent No.: US 7,548,958 B2
(45) Date of Patent: Jun. 16, 2009

(54) QUICK PICK APPARATUS AND METHOD FOR MUSIC SELECTION

(75) Inventors: Jeff Martin, Chesterfield, MO (US); Jeffrey J. Kalis, Rockford, MI (US); Sterling Heibeck, Grand Rapids, MI (US)

(73) Assignee: Rowe International Corporation, Grand Rapids, MI (US)

( * ) Notice: Subject to any disclaimer, the term of this patent is extended or adjusted under 35 U.S.C. 154(b) by 604 days.

(21) Appl. No.: 11/198,299

(22) Filed: Aug. 8, 2005

(65) Prior Publication Data

US 2007/0033321 A1 Feb. 8, 2007

(51) Int. Cl.
  G06F 15/16 (2006.01)
  G11B 7/085 (2006.01)

(52) U.S. Cl. .................... 709/217; 369/30.06

(58) Field of Classification Search .......... 369/30.06; 709/217; 715/716, 727; 463/25
  See application file for complete search history.

(56) References Cited

U.S. PATENT DOCUMENTS

| | | | | |
|---|---|---|---|---|
| 5,341,350 | A * | 8/1994 | Frank et al. | 710/48 |
| 5,510,573 | A * | 4/1996 | Cho et al. | 84/610 |
| 5,857,707 | A * | 1/1999 | Devlin | 283/56 |
| 5,959,945 | A * | 9/1999 | Kleiman | 381/81 |
| 6,212,128 | B1 | 4/2001 | Kalis et al. | |
| 6,421,651 | B1 | 7/2002 | Tedesco et al. | |
| 6,430,537 | B1 | 8/2002 | Tedesco et al. | |
| 6,609,169 | B1 * | 8/2003 | Powell | 710/301 |
| 6,714,489 | B2 * | 3/2004 | Kalis et al. | 369/30.06 |
| 6,904,004 | B1 * | 6/2005 | Van der Meulen | 369/30.28 |
| 7,216,008 | B2 * | 5/2007 | Sakata | 700/94 |
| 2001/0023403 | A1 * | 9/2001 | Martin et al. | 705/1 |
| 2001/0030912 | A1 | 10/2001 | Kalis et al. | |
| 2002/0113824 | A1 * | 8/2002 | Myers, Jr. | 345/810 |
| 2004/0010800 | A1 * | 1/2004 | Goci | 725/78 |
| 2004/0025185 | A1 * | 2/2004 | Goci et al. | 725/92 |
| 2004/0243482 | A1 * | 12/2004 | Laut | 705/27 |
| 2004/0255334 | A1 | 12/2004 | Logan | |
| 2004/0255340 | A1 | 12/2004 | Logan | |
| 2005/0060405 | A1 * | 3/2005 | Nathan et al. | 709/225 |
| 2005/0074100 | A1 | 4/2005 | Lederman | |
| 2005/0076376 | A1 | 4/2005 | Lind | |
| 2006/0018208 | A1 * | 1/2006 | Nathan et al. | 369/30.06 |
| 2006/0062094 | A1 * | 3/2006 | Nathan et al. | 369/30.06 |
| 2006/0239131 | A1 * | 10/2006 | Nathan et al. | 369/30.06 |
| 2007/0159934 | A1 * | 7/2007 | Weon | 369/30.06 |
| 2008/0086379 | A1 * | 4/2008 | Dion et al. | 705/14 |

* cited by examiner

*Primary Examiner*—J. Bret Dennison
(74) *Attorney, Agent, or Firm*—Dickstein Shapiro LLP (57) ABSTRACT

Systems and methods for quick song selection on any of a plurality of networked, digital jukeboxes is provided. The Quick Pick feature provides for efficient song selection for a jukebox user preferably using a set of the most popular songs on a particular jukebox machine. Preferably, the system and method allow a user to browse or select songs to play at a digital jukebox in an efficient manner, without the need for a user to know the title or artist of the song in advance of making a selection.

19 Claims, 5 Drawing Sheets

FIG. 5

QUICK PICK APPARATUS AND METHOD FOR MUSIC SELECTION

BACKGROUND OF THE INVENTION

For decades, the term jukebox was synonymous with a housing for a phonograph player and a collection of musical recordings stored in the housing as a plurality of records. These jukeboxes were usually large and were mainly located in establishments like bars and restaurants. Eventually, the records in jukeboxes were replaced with compact discs (CDs). Although compact discs increased the sound quality of conventional jukeboxes, routinely updating conventional jukeboxes was a lengthy and cumbersome task.

Updating conventional jukeboxes required a significant investment of time and money. Routemen were required to travel to each jukebox location to replace outdated recordings with up-to-date CDs or records. A new physical copy of each disc was needed for every location and many unneeded copies of the outdated recordings remained after removal from the jukebox. New ways to store and update musical recordings on jukeboxes were needed to eliminate or reduce this laborious and expensive update procedure.

The influx of digital music provided an opportunity to change the design and operation of conventional jukeboxes. As suggested in U.S. Pat. No. 5,355,302, conventional jukeboxes could be replaced with a network of computer jukeboxes capable of storing digital music in memory and updating the music contained on the jukebox over a network connection. Computer jukeboxes reduced the necessity of routemen to update jukeboxes manually. The computer jukeboxes provided many advantages beyond the saved expense in updating. A plurality of jukeboxes could now be controlled via a central management center, allowing tasks such as royalty accounting to be performed centrally. Digital music has become increasingly popular, and compression technologies decreased the necessary file size, allowing any computer system with speakers to become a jukebox. A large market was created for digital jukeboxes, including personal jukeboxes in homes.

With most digital jukebox systems, a user can scroll through alphabetical song listings in order to select a song. Additionally, some digital jukebox systems allow a user to type in the first few letters of a song title or artist name in order to search more rapidly when the user knows a particular song that he wants to hear. These methods require, however, that either the user know a particular song title in advance or that the user must spend a significant amount of time to search for a desired song.

These methods can be inconvenient. For example, the user may not know the exact song title or artist name for newly released songs. Thus, the user would have to scroll through an entire listing of available songs, perhaps in a given musical genre, in order to find the desired song.

Accordingly, there is a desire for a more flexible system and method for providing efficient song selection on networked jukeboxes where a user can quickly find popular songs. A central system for managing the jukeboxes and handling song selections is also desired.

SUMMARY

In various exemplary embodiments, the invention relates to a system and method for Quick Pick song selection on any of a plurality of networked, digital jukeboxes. Each of the networked, digital jukeboxes can store and play digital music files that may be downloaded from a central music repository. A central data center can be provided for managing the jukeboxes. The Quick Pick apparatus and/or methods narrow the selection field for a jukebox user. For example, the Quick Pick feature, when activated, may present only the most popular songs on a particular jukebox machine from which a user can choose a song for play.

A preferred embodiment of the invention provides a computer jukebox for playing songs in response to a user request. In this embodiment, the jukebox comprises at least one memory for storing a plurality of digital musical selections and information identifying the musical selections; a display for presenting song selections based on the information identifying the musical selections and for presenting a rapid song selection option to the user; a selector for allowing the user to select a digital musical selection to play on the jukebox and to select the rapid song selection; and a processor. The processor can execute the following acts: determining a frequency of selection for each of the digital musical selections stored in the at least one memory; creating a set of the most frequently selected musical selections; determining whether a user has selected the rapid song selection; causing the display to show information identifying a first musical selection from the set of most frequently selected musical selections if the user has selected the rapid song selection; determining if a user selects the first musical selection; retrieving the selected musical selection from the at least one memory if the user has selected the first musical selection; causing the display to present information identifying a second musical selection from the set of most frequently selected musical selections if the user has not selected the first musical selection.

Preferred embodiments of the invention also provide methods for presenting an option for a rapid song selection feature on a computer jukebox display comprising calculating a frequency of selection for each of a plurality of digital musical selections stored in at least one memory in the jukebox; creating a set of the most frequently selected musical selections based upon the calculated frequency; determining whether a user has selected the rapid song selection; causing the display to show information identifying a first musical selection from the set of most frequently selected musical selections if the user has selected the priority play option; determining if a user selects the first musical selection; retrieving the selected musical selection from the at least one memory if the user has selected the first musical selection; and causing the display to present information identifying a second musical selection from the set of most frequently selected musical selections if the user has not selected the first musical selection.

BRIEF DESCRIPTION OF THE DRAWINGS

The foregoing and other aspects of the invention will be better understood from the following detailed description of the invention, which is provided in connection with the accompanying drawings, in which.

DETAILED DESCRIPTION OF PREFERRED EMBODIMENTS

In the following detailed description, reference is made to the accompanying drawings, which form a part hereof and show by way of illustration specific embodiments in which the invention may be practiced. These embodiments are described in sufficient detail to enable those skilled in the art to practice the invention, and it is to be understood that other embodiments may be utilized, and that changes to the described embodiments may be made without departing from the spirit and scope of the present invention.

The term "jukebox" or "digital jukebox" or "computer jukebox" includes not only conventional jukeboxes that are found in bars and restaurants, but more broadly includes any computer with sophisticated audio play capabilities. Thus, any processing system that can play a song in response to a user's input is included within these terms as used herein. The term "Quick Pick" as used herein refers to a functionality of a computer jukebox to allow a user a rapid song selection process, preferably based on the most frequently selected musical selections, for choosing a song to play on the jukebox, as described with reference to several exemplary embodiments in more detail below.

Figure 1:
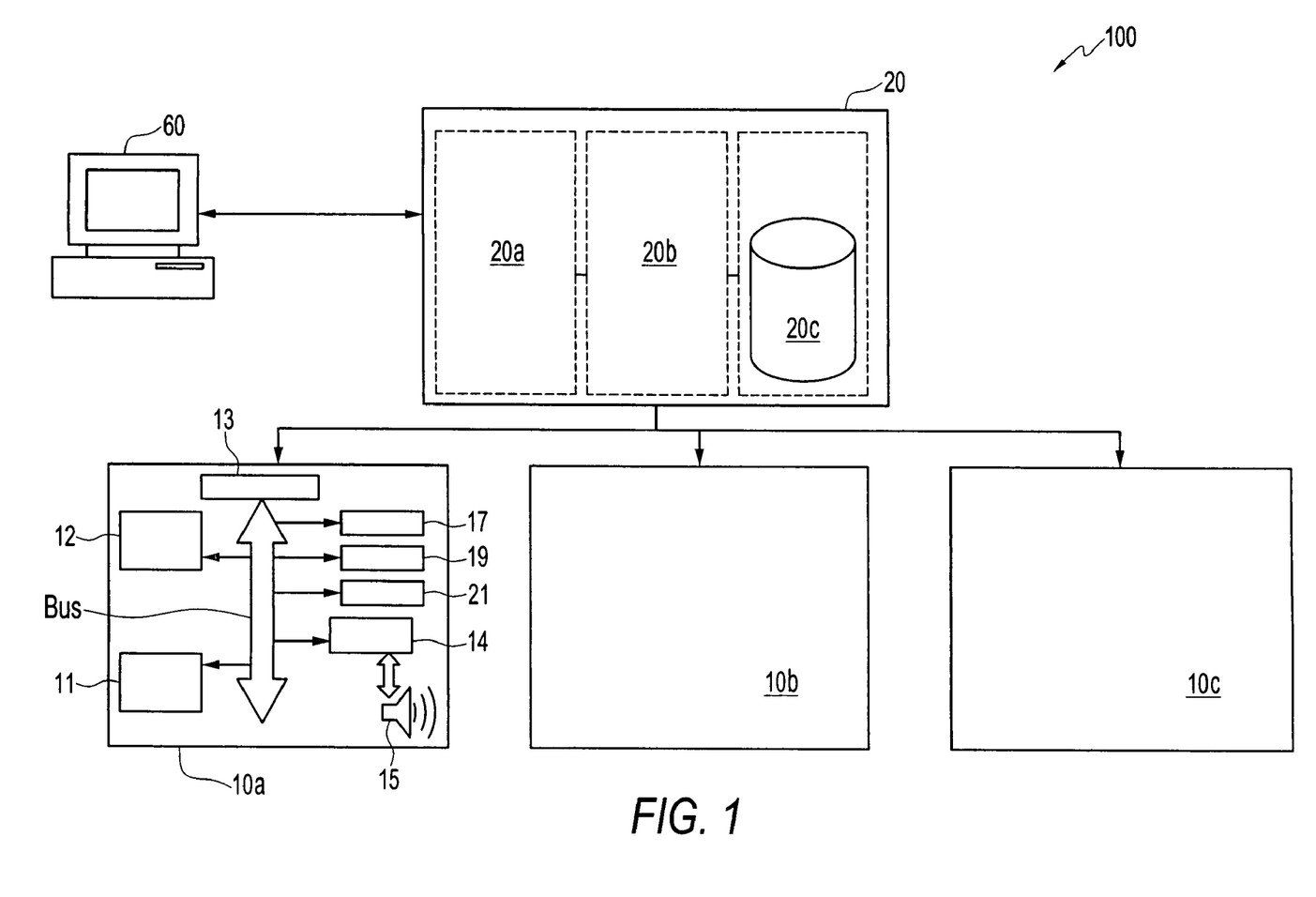
FIG. 1 is a block diagram of a part of a jukebox system in accordance with the invention.

Turning to FIG. 1, a portion of a jukebox system 100 according to a preferred embodiment of the invention is shown. The jukebox system 100 includes a plurality of networked jukeboxes 10a, 10b, 10c that are connected to a main data center 20. Each jukebox 10a, 10b, 10c has a Quick Pick selection feature, as described herein, for users to select songs for play on the jukebox 10. The Quick Pick feature permits a user to select among the most popular music on the jukebox 10, without needing to know the precise song title in advance.

The data center 20 is preferably a collection of computer servers 20a, 20b, 20c, each of which, it should be understood, may include all necessary computer hardware and software for receiving, sending, and processing information. When a collection of servers 20a, 20b, 20c, are used, each may function to communicate with a respective set of jukeboxes 10a, 10b, 10c, or each server 20a, 20b, 20c may provide particularized functions for the data center 20. For example, one of the servers 20a may be primarily for communicating with the jukeboxes 10a, 10b, 10c. An additional server 20b may be used for storing digital music files that can be downloaded by the individual jukeboxes 10a, 10b, 10c. Another server 20c may be used for storing a database 21 containing information necessary for managing each of the individual jukeboxes 10a, 10b, 10c. This database 20c may also contain information for calculating billing and/or royalty payments.

Each jukebox 10 can include at least one memory 11 for storing a plurality of digital music files and information relating to the stored musical files. Other media for storing music, such as CDs or vinyl albums, may be played by the jukeboxes 10a, 10b, 10c. The memory may be a hard drive, a collection of hard drives, or any other type of memory capable of storing large quantities of digital music files (compact flash, secure digital, memory stick, flash RAM). Each jukebox 10 also has a display 21, which may display graphics, such as album covers, but also displays text such as selection instructions and song titles. The display 21 is preferably in the form of a touch-screen, such that a user can make his selections by pressing points on the display screen 21. The display 21 may be a CRT, LCD, plasma, DLP or any other form of a monitor or screen. The jukeboxes 10 also have a processor 12, a communication interface 13, and an audio reproduction circuit 14 coupled to at least one speaker 15 for replaying the songs. The audio reproduction circuit 14 may include a sound card, a digital-to-analog converter, and means for decompressing compressed, digital files. Other optional parts of the jukeboxes 10 include a money detector 17, such as a coin, bill, and/or credit card acceptor, and a user input device 19, (e.g., a keypad, manual keyboard, mouse, trackball, pen and other types of selection devices).

As shown in FIG. 1, another aspect of the system 100 is a management device 60 for an operator to manage one or more jukeboxes 10a, 10b, etc. The management device 60 may take the form of a personal computer. The device 60 communicates data and requests to the central data center 20 which communicates the management data to the particular jukebox 10. The management data and requests may include new content for the jukebox 10 or may relate to setting operating parameters such as the cost of a play credit.

Figure 2:
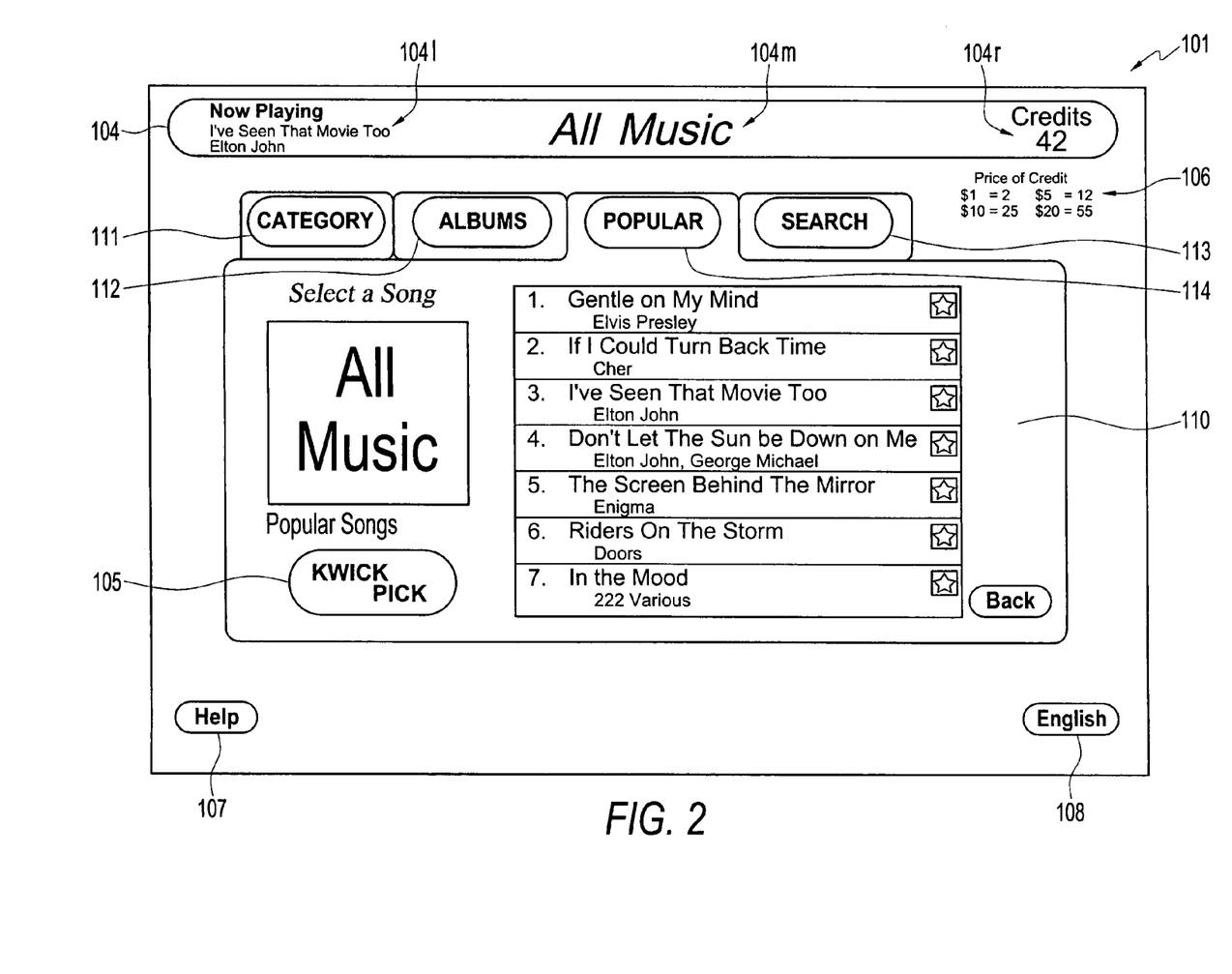
FIG. 2 shows an exemplary user interface on a digital jukebox at a first step of a first exemplary selection method in accordance with the invention.

Turning to FIG. 2, a first exemplary screen shot is shown depicting a user interface on a display 21 for a jukebox 10 in accordance with an embodiment of the invention. The first screen shot 101 includes a "Help" request button 107, pricing information 106, a language toggle button 108 for changing the language of the text displayed on the screen, and a header bar 104. At the left hand side of the header bar 104(l), the song currently playing on the jukebox is displayed. On the right hand side of the header bar 104(r), the total number of credits remaining is shown. The title of the screen shot in the middle of the header bar 104(m) states a particular musical genre, if any, in which user is searching. Genres may include rock, country, and rap, for example; and if no particular genre is selected, the title reads "ALL MUSIC," as shown.

In the center of the exemplary screen shot 101 is a song selection area 110. As shown, a user can select a song in several ways. If a particular musical genre is desired, the user can select the "Category" button 111, and a genre listing will appear. If a user wants to scroll through album titles, he can select the "Album" button 112. The "Search" Button 113 allows the user to enter the first few letters of either a song title or artist name, to then search for a particular song selection. Finally, a "Popular" Button 114 causes the display to show to the user the most frequently requested songs in order of popularity.

The "Popular" feature may show a user the most popular song selections in a particular genre, or if no genre is specified, the display can list the overall most popular musical selections. Once the "Popular" function is selected, the display screen 21 may display a Quick Pick button 105, as shown in the lower left hand corner of the selection screen in FIG. 2. Alternatively, the rapid selection, Quick Pick feature of the invention could be implemented having its own button on the main selection screen, therefore eliminating the need for a user to first select the "Popular" button 114.

A user can activate the Quick Pick feature by pressing on the touchscreen display 21 in the area of the Quick Pick button 105. Although shown as one Quick Pick button 105, it should be understood that other methods of activating this functionality are also within the scope of the invention. For example, the Quick Pick button 105 could be replaced with two buttons that would allow a user to select the Quick Pick functionality for either "one credit" or "all remaining credits." In the case of a Quick Pick feature for one credit, the user can use the Quick Pick method described herein for each song selection, and the user will be returned to the first selection screen shot 101 upon each completed song selection. Alternatively, if a user selects Quick Pick feature for each remaining credit, the user will stay in the screen shots shown in FIGS. 3 and 4 and as described below until a song selection is made for each remaining credit or until the user decides to terminate song selection. For purposes of simplification, the remainder of this description assumes that the Quick Pick feature has been activated for selecting one song.

Figure 3:
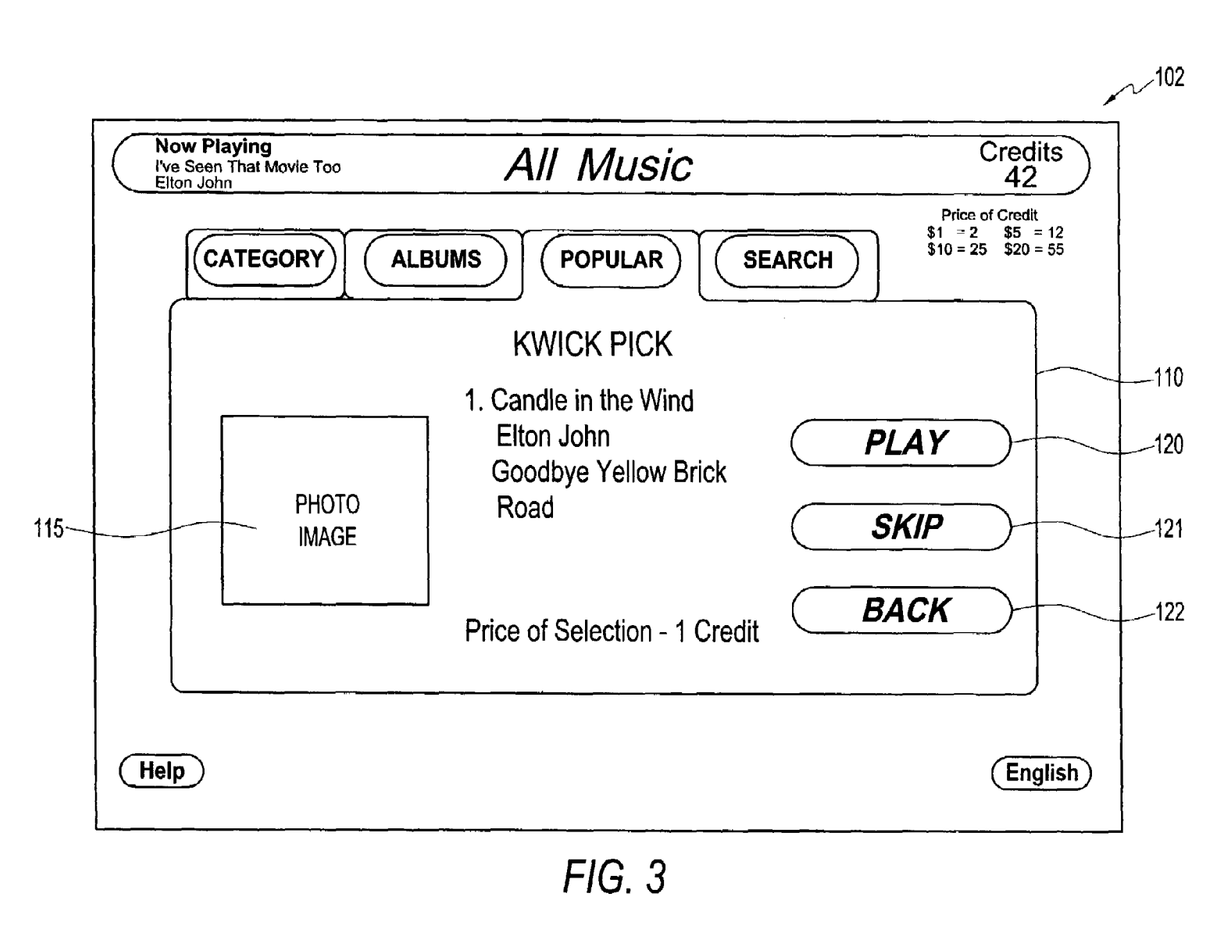
FIG. 3 shows an exemplary user interface on a digital jukebox during a step of the first exemplary selection method of the invention after the interface shown in FIG. 2.

Once the Quick Pick button 105 is selected, the display screen 21 displays the exemplary screen shot 102 as a user interface as shown in FIG. 3. The header bar 104 is unchanged from the previous screen shot 101 (FIG. 2). The center song selection area 110, however, now displays a first song 115 that can be selected. The first song 115 can be displayed, as shown, by including identifying data such as an album cover, the song title, artist name, and album name.

The first song selection 115 displayed to a user in the Quick Pick feature may be chosen a number of ways. It is preferred that the songs displayed during the Quick Pick method are popular songs, as determined by the frequency that songs are selected by users of a particular jukebox 10. For example the number of times a song is played in a given period of time (e.g., day, week, month, year) can be measured. Accordingly, a processor 12 (FIG. 1) in the jukebox is capable of calculating the play statistics for each song selection. The first song displayed during the Quick Pick feature may represent the most popular song stored in memory 11. Alternatively, the first song may be randomly selected from a set of the most popular songs as determined by the processor 12. In this manner, the memory 11 stores a set or listing of popular songs, for example the ten most frequently requested songs on the jukebox 10, from which a randomizer may select the first song selection 115. If such a randomizer is utilized, the first song 115 presented to the user may be different each time that the Quick Pick feature is used.

In addition, it should be understood that the most popular songs may not be stored locally in a memory 11 for the jukebox 10, but rather, the set of most popular songs may include song selections that are downloadable from the central data center 20. Accordingly, the first song 115 presented to the user may require additional credits if it needs to be downloaded to the jukebox 10. It is preferred that each jukebox 10 stores its own list of popular music, even if some of the selections on the list are not locally resident. However, it is also possible that for the network 100 one central list of popular songs can be used by each jukebox 10a, 10b, 10c during the Quick Pick feature. As such, the central list can be calculated by statistics at the data center, and that central list can be stored centrally as well and distributed to the jukeboxes 10a, 10b, 10c at pre-determined intervals.

As shown in FIG. 3, three buttons adjacent the first song identifier are provided in the center song selection area 110 for allowing a user to navigate quickly through the popular songs. The three navigation buttons allow a user to either "Play" 120 the song selection 115 currently identified on the exemplary screen shot 102, "Skip" 121 the song selection, or go "Back" 122 to a previous selection. It should be noted that if the "Play" button 120 is pressed, the song may automatically be placed in a music queue for play. Alternatively, an additional screen shot (not shown) may be implemented to confirm that the user wishes to play the selected song. In addition, as described above, if the song is not resident locally in memory 11, the selection may cost additional credits, and another screen may be necessary to tell the user to enter more money for downloading the selected song.

Figure 4:
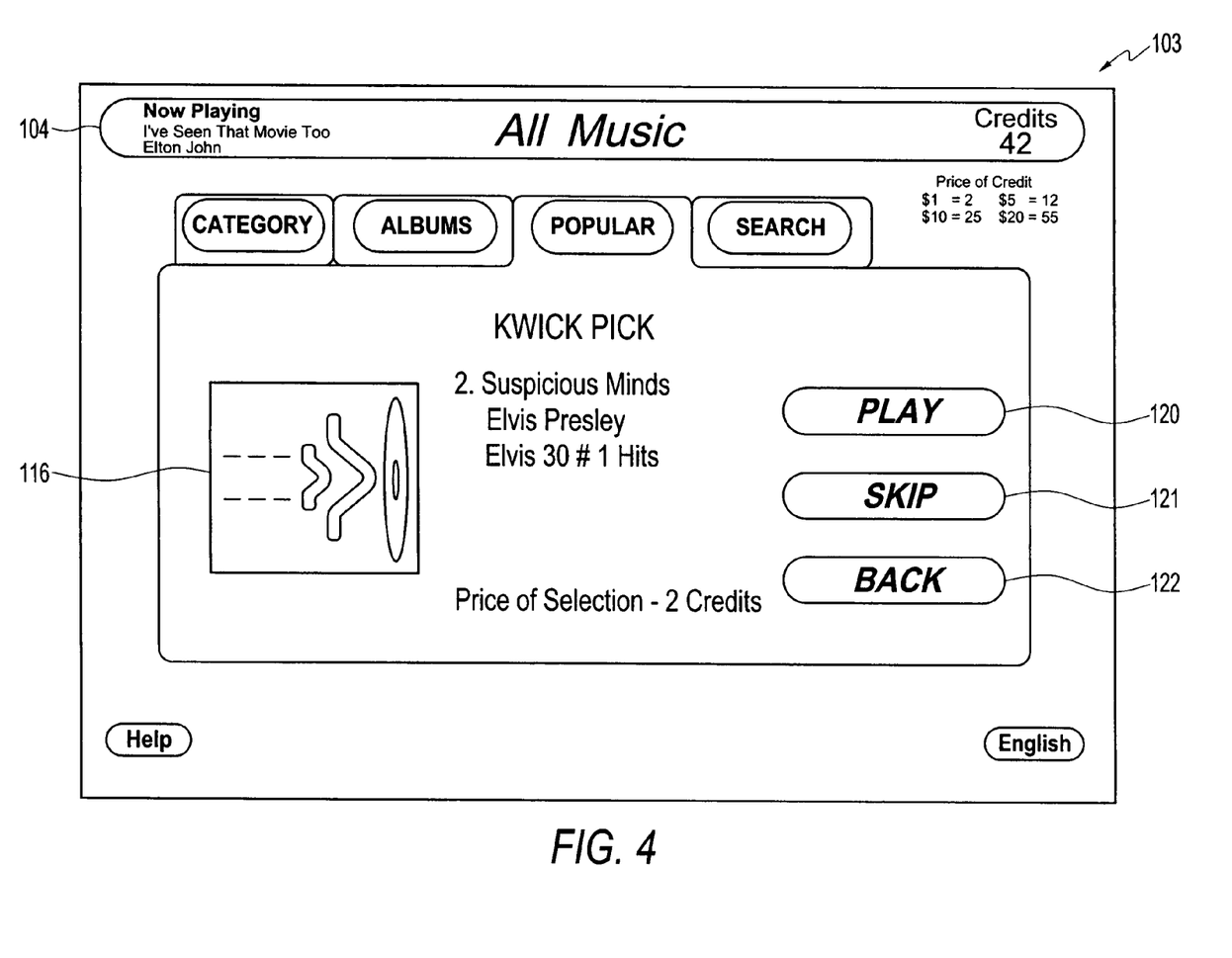
FIG. 4 shows an exemplary user interface on a digital jukebox during a step of the first exemplary selection method of the invention after the interface shown in FIG. 3.

The exemplary screen shot 103 of FIG. 4 shows the user interface displayed on a screen 21 if the user selected the "Skip" button 121 during the previous interface 102. Here, information identifying a second musical selection 116 is displayed on the screen 21. As before, this second musical selection 116 may represent the second most popular musical selection or it could be a second randomly selected song from a set of the most popular songs for that jukebox 10. As in the previous screen shot 102, the user is again given the option of playing the currently displayed selection 116 by pressing the "Play" button 120, skipping this selection 116 to go to a third selection by pressing the "Skip" button 121, or going back to view the first musical selection 115 by pressing the "Back" button 122.

Figure 5:
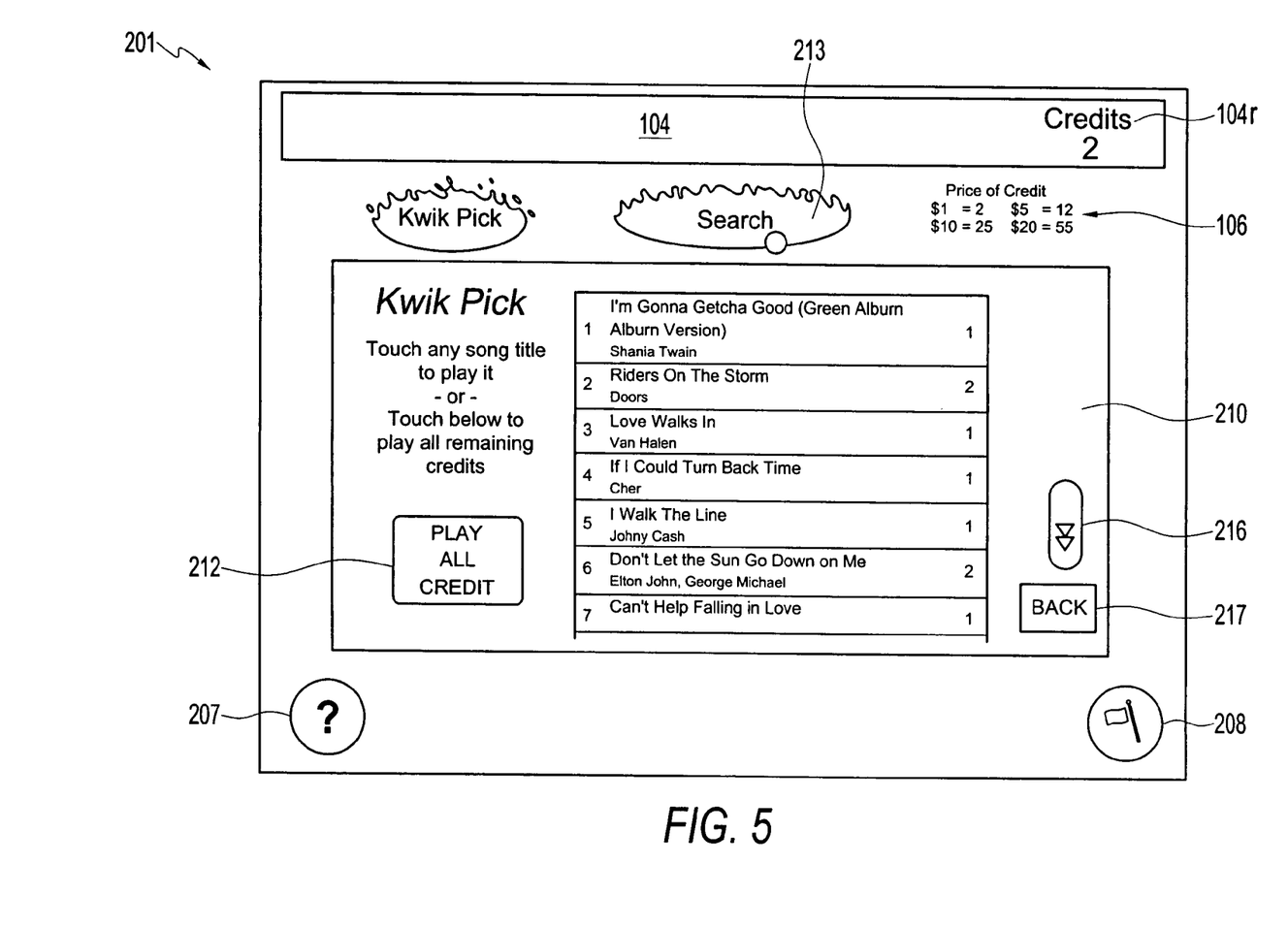
FIG. 5 shows an exemplary user interface on a digital jukebox during a second exemplary method of song selection in accordance with the invention.

FIG. 5 shows screen shot 201 which depicts a user interface on a jukebox display 21 in accordance with a second exemplary method of selecting a song. It should be understood that the screen shot 201 represents the first user interface after a user has selected an option to activate the Quick Pick feature in accordance with the second exemplary method. For example, a first step of this method includes screen shot 101 (FIG. 2), where a user can activate Quick Pick by pressing an associated header button.

The screen shot 201 shows the header bar 104 and the pricing information 106. In this embodiment, help button 107 and language toggle button 108 are graphical. A question mark button 207 and the flag button 208 are provided to give the user access to help and language selection features.

The main section of the screen shot 201 is a music selection area 210. In accordance with the second exemplary Quick Pick method, songs 211 are not displayed one at a time, but rather, a random selection of the most popular songs are displayed all at once. For example, after contacting the Quick Pick button, a user may be shown the exemplary screen shot 201 including a list of the forty most popular songs 211 on the jukebox 10 in a random order. It should be understood that the songs 211 may represent digital song files stored in the jukebox, or song files that can be downloaded from a central memory 20b. The list may be limited to only songs 211 that have been played multiple times; so the list may be shorter than forty. Other list sizes are also within the scope of the invention. The list is preferably randomized so each subsequent touch of the Quick Pick button will display a slightly different list even though the list contains the same songs. Alternatively, the list can list the songs 211 in a descending order of popularity.

For some applications, the screen selection area 210 may not be large enough to play the entire list, as shown here the area 210 displays 7 songs per screen. Up and down arrows 216 allow a user to optionally scroll through additional songs on the list. Additionally, although the songs 211 are shown here represented by song titles, other forms of identifying the songs, such as by a graphic representing the song may also be used and shown on the display 201. At any time, a user may press the "Back" button 217 to go back to the main selection screen 101 (FIG. 2).

In one embodiment, the cost in credits 219 to play a song (e.g., song 211) can be displayed. At this point, a user can touch any song 211 on the list to play it instantly without confirmation. The list can be updated by removing the selected song 211 and the corresponding number of credits will be deducted from the "Credits" shown in the header 104(r).

In another embodiment, a user may touch the PLAY ALL CREDIT button 212 at any time to select all songs 211 on the list starting with the song in the first position on the list and continuing until all existing credit is exhausted. For example, if only one credit remains and the next song on the list costs two or more credits, that song is skipped and the next one-credit song in the list is selected. After all credits are exhausted the Quick Pick screen 201 can close and return the user to the main selection screen, such as screen 101 shown in FIG. 2.

If the Quick Pick list of songs 211 does not consume all remaining credits (more credit exists on the box than it takes to play all the songs in the list), the Quick Pick screen 201 can close after the last song 211 in the list is selected. Remaining unused credits will be displayed in the credit area 104(*r*) of the main selection screen 101. Touching the Quick Pick button again in this situation can result in an empty song list. The credit on the jukebox must be reduced to "0" before a new list will be displayed. The user may choose individual songs in the list, or not, and then manually close the Quick Pick screen 201 with credit left over. In this case, if the customer touches the Quick Pick button again, the Quick Pick screen 201 can display the list exactly the same way is was when the screen 201 was manually closed. Again, the credit on the jukebox must be reduced to "0" before a new list will be displayed.

On the screen shot 201, a "Search" button 213 is also included. Activation of the "Search" button 213 allows a user to exit the Quick Pick feature, and to search through a complete listing of all songs available for play on the jukebox. As with conventional search features, the user may be able to search using the artist, song title, or album name, in order to locate a desired song. Alternatively, a search feature could be implemented to give the user searching functionality within the list of the most frequently selected songs, and therefore, to remain within the Quick Pick functionality.

The processes and devices described above illustrate preferred methods and typical devices of many that could be used and produced. The above description and drawings illustrate embodiments, which achieve the objects, features, and advantages of the present invention. However, it is not intended that the present invention be strictly limited to the above-described and illustrated embodiments. Additionally, any modifications, though presently unforeseeable, of the present invention that come within the spirit and scope of the following claims should be considered part of the present invention.

What is claimed as new and desired to be protected by Letters Patent of the United States is:

1. A computer jukebox for playing songs in response to a user request, the jukebox comprising:
    at least one memory for storing a plurality of digital musical selections and information identifying the musical selections;
    a display for presenting song selections based on the information identifying the musical selections and for presenting a rapid song selection option to the user;
    a selector for allowing the user to select a digital musical selection to play on the jukebox and to select the rapid song selection option; and
    a processor for executing acts comprising:
        determining a frequency of selection for each of the digital musical selections stored in the at least one memory;
        creating a set of the most frequently selected musical selections;
        determining whether a user has selected the rapid song selection option;
        causing the display to show information identifying a first musical selection from the set of most frequently selected musical selections if the user has selected the rapid song selection option;
        presenting an option to the user to automatically use any remaining credits by causing the jukebox to select a subset of the set of most frequently selected musical selections;
        determining if the user selects the option to automatically use any remaining credits by causing the jukebox to select a subset of the set of most frequently selected musical selections; and
        automatically using any remaining credits to select and play a subset of the set of most frequently selected musical selections if the user selects the option to automatically use any remaining credits by causing the jukebox to select a subset of the set of most frequently selected musical selections.

2. The computer jukebox of claim 1, wherein the first musical selection is the most frequently selected musical selection.

3. The computer jukebox of claim 2, wherein the processor further causes the display to show information identifying a second musical selection from the set of most frequently selected musical selections and wherein the second musical selection is the second most frequently selected musical selection.

4. The computer jukebox of claim 1, wherein the at least one musical selection from the selected subset of the set of most frequently selected musical selections is transmitted to the computer jukebox from a central location.

5. The computer jukebox of claim 1, wherein a randomizer is used to determine which musical selection from the set of most frequently selected musical selections is the first musical selection.

6. The computer jukebox of claim 1, wherein the identifying information includes at least one of: song title, artist name, and a graphic of album.

7. The computer jukebox of claim 1, wherein the display also permits a user to select a genre of music either before or after selecting a priority play option.

8. The computer jukebox of claim 7, wherein the display is adapted to present a selection of the most popular musical selections in a genre after the genre is selected.

9. The computer jukebox of claim 1, further comprising: a credit acceptor and calculator to determine a number of remaining credits available.

10. The computer jukebox of claim 1, wherein the processor determines if a user selects the first musical selection by determining whether the user selected a play button on the display.

11. A method for selecting a song on a computer jukebox comprising:
    presenting an option for a rapid song selection feature on a computer jukebox;
    calculating a frequency of selection for each of a plurality of digital musical selections stored in at least one memory in the jukebox;
    creating one of a set or a list of the most frequently selected musical selections based upon the calculated frequency;
    determining whether a user has selected the rapid song selection option;
    if the user has selected the rapid song selection option, causing the computer jukebox to show information identifying at least a first musical selection from the set or list of most frequently selected musical selections;
    presenting an option to the user to automatically use any remaining credits by causing the jukebox to select a subset of the set or list of most frequently selected musical selections;

determining if the user selects the option to automatically use any remaining credits by causing the jukebox to select a subset of the set or list of most frequently selected musical selections first musical selection; and automatically using any remaining credits by causing the jukebox to select and play a subset of the set or list of most frequently selected musical selections if the user selects the option to automatically use any remaining credits to select a subset of the set or list of most frequently selected musical selections.

12. The method of claim 11, further comprising allowing a user to scroll in a listing of frequently played selections when the user selects the rapid song selection option.

13. The method of claim 11, further comprising placing the subset of the set or list of most frequently selected musical selections in a queue for play.

14. The method of claim 11, further comprising receiving at least one of the songs from the subset of the set or list of most frequently selected musical selections from a central memory located remote from the computer jukebox.

15. The method of claim 11, further comprising using a randomizer to identify a first musical selection from the set or list of most frequently selected musical selections.

16. The method of claim 11, further comprising displaying one of an album cover graphic, artist name, and album name associated with the most frequently played song stored in memory.

17. A method for selecting a song on a computer jukebox that accepts credits for playing music, the method comprising:

presenting on a display an option for a rapid song selection feature on a computer jukebox;

calculating a frequency of selection for each of a plurality of digital musical selections stored in at least one memory in the jukebox;

creating a set of the most frequently selected musical selections based upon the calculated frequency;

determining whether a user has selected the rapid song selection option;

causing the display to show the set of most frequently selected musical selections in a random order if the user has selected the rapid song selection option;

presenting an option to the user to automatically use any remaining credits by causing the jukebox to select and play a subset of the set of frequently selected musical selections;

determining if the user selects the option to automatically use any remaining credits by causing the jukebox to select a subset of the set of most frequently selected musical selections; and automatically using any remaining credits to select and play a subset of the set of most frequently selected musical selections if the user selects the option to automatically use any remaining credits by causing the jukebox to select a subset of the set of most frequently selected musical selections.

18. The method of claim 17, wherein the subset is randomly selected from the set of most frequently played selections, by the jukebox.

19. The method of claim 17, further comprising presenting on the display an option for the user to search through the available musical selections by at least one of: artist name, song title, and album title.

* * * * *